United States Patent [19]

Furumura

[11] Patent Number: 4,774,749
[45] Date of Patent: Oct. 4, 1988

[54] PLAIN BEARINGS AND PROCESS FOR MANUFACTURING SAME

[75] Inventor: Kyozaburo Furumura, Ninomiya, Japan

[73] Assignee: Nippon Seiko Kabushiki Kaisha, Tokyo, Japan

[21] Appl. No.: 926,423

[22] Filed: Nov. 3, 1986

Related U.S. Application Data

[62] Division of Ser. No. 630,004, Jul. 12, 1984.

[30] Foreign Application Priority Data

Jul. 27, 1983 [JP] Japan .............................. 58-135687
Sep. 22, 1983 [JP] Japan .............................. 58-174365

[51] Int. Cl.$^4$ ............................................ B21D 53/10
[52] U.S. Cl. ...................... 29/149.5 NM; 29/149.5 C; 29/149.5 PM; 29/445; 29/515; 384/297; 384/907; 419/10; 419/28; 419/38; 419/61
[58] Field of Search .................... 29/149.5 R, 149.5 C, 29/, 149.5 DP, 149.5 S, 149.5 NM, 149.5 PM, DIG. 31, 428, 445, 505, 515, 527.1; 384/297, 299, 300, 907; 419/10, 26, 28, 38, 61

[56] References Cited

U.S. PATENT DOCUMENTS

| | | | |
|---|---|---|---|
| 2,331,584 | 10/1943 | Underwood | 29/149.5 PM |
| 2,374,747 | 5/1945 | Hardy | 29/149.5 PM |
| 2,390,160 | 12/1945 | Marvin | 29/149.5 PM |
| 2,461,765 | 2/1949 | Olt | 29/DIG. 31 |
| 2,720,119 | 10/1955 | Sherman | 29/149.5 NM |
| 2,815,253 | 12/1957 | Spriggs | 384/299 |
| 3,359,613 | 12/1967 | Rye | 29/149.5 NM |

FOREIGN PATENT DOCUMENTS 1066548  6/1954  France .................. 29/149.5 DP

*Primary Examiner*—Howard N. Goldberg
*Assistant Examiner*—Ronald S. Wallace
*Attorney, Agent, or Firm*—Louis E. Marn

[57] ABSTRACT

A plain bearing comprises a metal cylinder as an external member and a resinous cylinder as an internal member, in which the outer surface of the resinous cylinder is firmly engaged and bitten with a concavo-convex portion formed on the inner surface of the metal cylinder. A process for manufacturing the plain bearing comprises producing the metal cylinder, forming the concavo-convex portion on the inner surface of the metal cylinder, combining the concavo-convex portion of the metal cylinder with the resinous cylinder, inserting a core pin into the interior of a combined cylinder of the metal cylinder and the resinous cylinder, squeezing the combined cylinder through a draw die and producing a finished plain bearing.

8 Claims, 5 Drawing Sheets

Fig.1
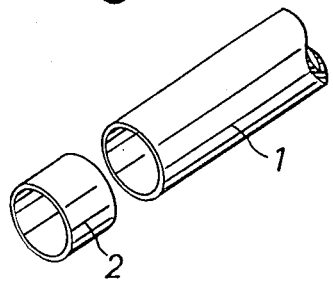
Fig.2
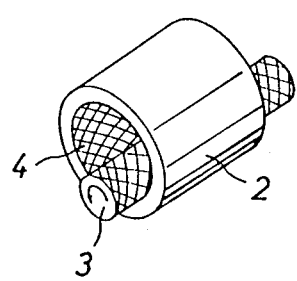
Fig.4
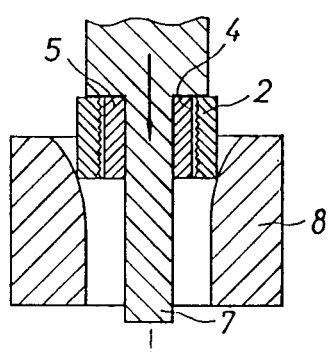
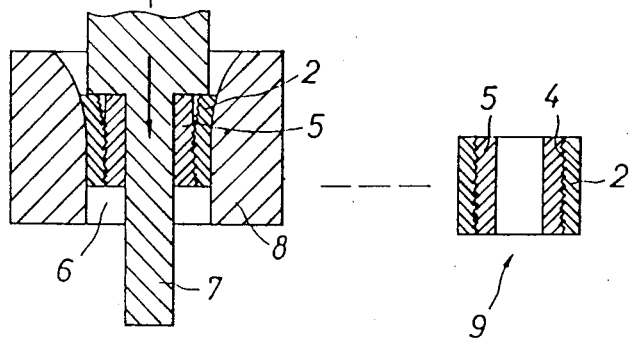
Fig.3
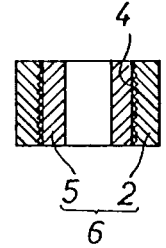
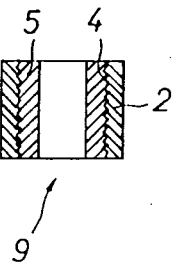

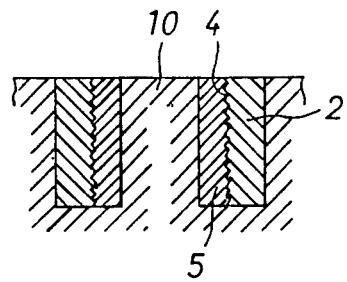
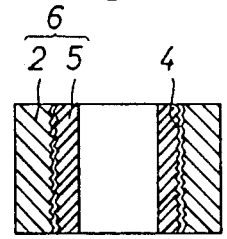
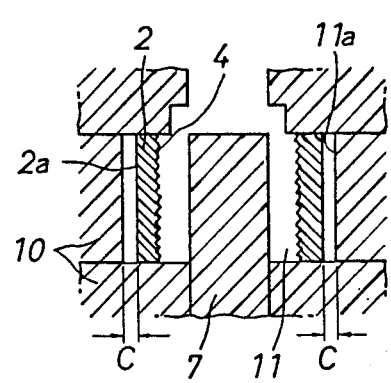
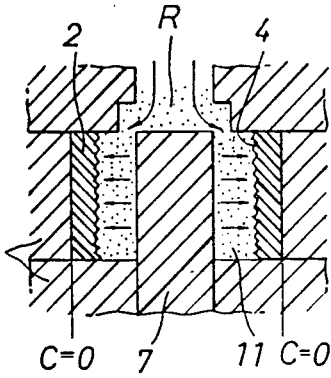
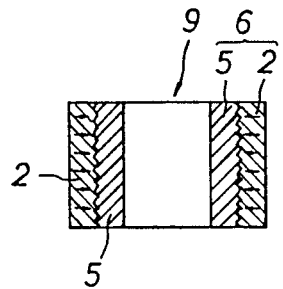

PLAIN BEARINGS AND PROCESS FOR MANUFACTURING SAME

This is a division, of application Ser. No. 06/630,004, filed July 12, 1984.

BACKGROUND OF THE INVENTION

(1) Field of the invention

This invention relates to plain bearings and process for manufacturing same, in which a resinous cylinder as a sliding member is integrally combined with a metal cylinder.

(2) Description of the prior art

Conventionally, the plain bearings employing a resinous member include, e.g., a purely resin-made bearing, a winding bushing type bearing, a metal bearing having jointed a resinous member into the interior of a metal bush, etc.

Referring first to the purely resin-made bearing, a thinly formed resinous cylinder is inferior in strength, so that a thickly formed resinuous cylinder is used at present. However, the disadvantage of the latter is that after it has been fixed in a housing, the shrinkage of the internal diameter thereof becomes large due to the temperature variation, thereby it is impossible to set a clearance in a radial direction relative to a shaft to no more than 50 $\mu$m. Accordingly, the rotation accuracy of the thickly formed cylinder is inferior and its initial abrasion is enlarged.

Referring to the winding bushing type bearing, it is, e.g., a cylindrical metal plate of which inner surface is coated with a preferred resin. The inaccuracy of right circularity of this bearing is within more or less 50 $\mu$m and it requires a clearance gap of more than 50 $\mu$m. Accordingly, the accuracy of this type of bearing is not so high.

Referring to the metal bearing having jointed a resinous cylinder, its manufacturing process has several defects and needs a time-consuming work. For example, when the resinous member is made of polytetrafluoroethylene, it is impossible to use any adhesive, so that the portion of bonding the resinous cylinder with the metal bush must be treated chemically. The task of this invention is to remove the aforesaid disadvantages of the conventional art.

BRIEF SUMMARY OF THE INVENTION

It is therefore an object of this invention to provide a plain bearing which has excellent strength and high accuracy. More specifically, it is of a double construction, namely a metal cylinder as an external member and a resinous cylinder as an internal member, in which the outer surface of the resinous cylinder is firmly engaged and bitten with a concavo-convex portion formed on the inner surface of the metal cylinder.

It is another object of this invention to provide a process for manufacturing a plain bearing, which comprises: a step of producing a metal cylinder; a step of forming a concavo-convex portion on the inner surface of the metal cylinder; a step of combining the concavo-convex portion of the metal cylinder with the resinous cylinder; and a step of inserting a core pin into the interior of a combined cylinder of the metal cylinder and the resinous cylinder, squeezing said combined cylinder through a draw die and producing a finished plain bearing.

It is another object of this invention to provide a process for manufacturing a plain bearing, comprising: a step of producing a metal cylinder; a step of forming a concavo-convex portion on the inner surface of said metal cylinder; a step of inserting said metal cylinder provided with said concavo-convex portion into a mold for injection or compression molding, injecting fused resins into said mold and obtaining a combined cylinder of the metal cylinder and the resinous cylinder by means of insert molding; and a step of inserting a core pin into the interior of said cylinder, squeezing said combined cylinder through a draw die and producing a finished plain bearing.

It is a further object of this invention to provide a process for manufacturing a plain bearing, comprising: a step of producing a metal cylinder; a step of forming a concavo-convex portion on the inner surface of said metal cylinder; a step of inserting said cylinder metal into an injection mold while forming a clearance between the inner side of the injection mold and the outer surface of said metal cylinder; a step of injecting fused resins into said injection mold under high pressure and extending said metal cylinder until said clearance becomes zero, namely to the degree that the metal cylinder is subject to plastic deformation, thereby combining said concavo-convex portion of said metal cylinder integrally with a resinous portion formed by fused resins; and a step of producing a finished plain bearing.

According to one aspect of this invention, the aforesaid metal cylinder may be prepared by cutting off a drawn metal pipe or produced by sintering metallic granules.

Other and further objects and advantages of this invention will be apparent from the following description taken in connection with the accompanying drawings.

BRIEF DESCRIPTION OF THE ACCOMPANYING DRAWINGS

FIGS. 1 to 4 are views of a process for manufacturing a plain bearing according to a first example of this invention, wherein FIG. 1 is a perspective view of a metal cylinder produced by cutting off a metal pipe, FIG. 2 is a perspective view of the process for forming a concavo-convex surface on the inner surface of the metal cylinder, FIG. 3 is a vertical section view of the combined cylinder and FIG. 4 is a vertical section view of the process for squeezing the combined cylinder by means of a draw die and obtaining a finished product.

FIGS. 5 and 6 are section views of a process for manufacturing a plain bearing according to a second example of this invention, wherein FIG. 5 is a vertical section view of the process for mounting the metal cylinder in a mold cavity and insert-molding fused resins therein, and FIG. 6 is a vertical section view of the condition in which the combined cylinder is cooled and solidified after the insert molding.

FIGS. 7 to 9 are section views of a process for manufacturing a plain bearing according to a third example of this invention, wherein FIG. 7 is a section view for the process for mounting the metal cylinder in a mold cavity, FIG. 8 is a section view of the condition in which the fused resins are injected into the mold cavity under high pressure and FIG. 9 is a section view of the condition in which the combined cylinder is coodled and solidified, and obtained as a finished product.

FIGS. 12 and 13 are section views of a process for manufacturing a plain bearing according to a fifth example of this invention, wherein FIG. 13 is a section view of the condition in which the plain bearing in FIG. 12 is mounted on a linearly reciprocal shaft.

PREFERRED EXAMPLES OF THE INVENTION

Figure 10:
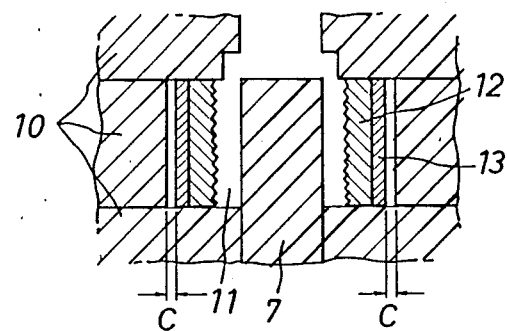
FIGS. 10 and 11 are section views of a process for manufacturing a plain bearing according to a fourth example of this invention, in which a metal cylinder is produced by sintering metallic granules.

I. A first example of the process for manufacturing a plain bearing will be described with reference to FIGS. 1 to 4.

This process consists of the following steps.

(1) Step for preparing a metal cylinder

As shown in FIG. 1, a metal cylinder 2 can be prepared by cutting off a drawn metal pipe 1. The metal pipe 1 is made of aluminium.

Since the metal cylinder 2 is required to be subject to plastic deformation by a squeezing treatment, a highly pressurized injection molding or the like, preferably it is deformable easily and its yield strength is preferably no more than 2,000 kg/cm$^2$. Accordingly, the metal cylinder 2 is preferably made of aluminium, copper or the like.

(2) Step for forming a concavo-convex portion

Referring to FIG. 2, the internal surface of the metal cylinder 2 is provided with concavo-convex notches 4 by rolling a knurl roll 3 along the internal surface thereof or by machining.

(3) Combination step

Referring to FIG. 3, a combined cylinder 6 is formed by inserting into the metal cylinder 2 forming the concavo-convex notches 4 a resinous cylinder of which outer diameter is slightly smaller than the internal diameter of the metal cylinder 2.

(4) Squeezing step

Referring to FIG. 4, a core pin 7 is fit into a hollow part of the combined cylinder 6 and the combined cylinder 6 is squeezed by passing it through a draw die 8. As a result of squeezing, the outer diameter of the metal cylinder 2 is reduced by 0.1 to 0.8 mm. Thus, the external periphery of the resinous cylinder 5 is engaged and bitten with the concavo-convex portion 4 of the metal cylinder 2. Both the metal cylinder 2 and the resinous cylinder 5 are formed integrally as a finished plain bearing 9. Further, it is optional to reinforce bonding of the former with the latter by a suitable adhesive.

(5) Finishing step

The external surface, internal surface and edges of the plain bearing 9 are given accuracy by means of machining.

II. A second example of this invention will now be described with reference to FIGS. 5 and 6.

The process according to this example is applicable particularly for resilient resins, hard and fragile resins such as, e.g., polyphenylene sulfide, polyacetal, etc. Those resins cannot be provided with the concavo-convex portion 4 of the metal cylinder 2 by means of squeezing of the draw die 8. This example aims at removing such inconveniences.

Since the steps for preparing the metal cylinder 2 and forming the concavo-convex portion 4 are the same as the first example, its description will be omitted.

(1) Combination step by insert molding

The metal cylinder 2 provided with the concavo-convex portion 4 is inserted in a mold 10 for injection molding or compression molding in combination with the resinous cylinder 5. (Refer to FIG. 5.)

Soon after insert molding, the outer surface of the resinous cylinder 5 is closely engaged and bitten with the concavo-convex portion 4 of the metal cylinder 2. After the molded product is taken out of the mold 10 and subject to a lower temperature of outer air, as shown in FIG. 6 there occurs a slight clearance between the notches 4 of the metal cylinder 2 and of the resinous cylinder 5 due to molding shrinkage.

(2) Squeezing step

The combined cylinder 6 thus produced is squeezed by passing it through the draw die 8 just like the process of the first example. Thus, the same finished plain bearing as the first example can be manufactured.

III. A third example of this invention will be described with reference to FIGS. 7 and 9.

Since the steps for preparing the metal cylinder 2 and forming the concavo-convex portion 4 are the same as the first example, its description will be omitted.

(1) Step of inserting the metal cylinder into a mold cavity

As shown in FIG. 5, this step is to insert into the cavity 11 of the mold 10 the metal cylinder 2 having the concavo-convex portion 4. Then, the insert step is made by forming a clearance C between a wall surface 11a of the tubular cavity 11 of the mold 10 and the outer surface 2a of the metal cylinder 2.

Since the metal cylinder 2 enables a certain deformation, it can be extended through the cavity 11. Generally, at the time of the insert molding, it is not desirable to make large the clearance. However, according to this example the clearance is formed larger.

(2) Highly pressurized injection molding step.

As shown in FIG. 8, a certain quantity of fused resins R are injected under a high pressure of, e.g., over 1,000 kg/cm$^2$ between the concavo-convex portion 4 of the metal cylinder 2 inserted into the cavity 11 and a core pin 7, thereby the metal cylinder 2 is extended up to the wall surfaces 11a of the cavity 11. As shown in FIG. 9, the fused resins R are solidified and transformed into the resinous cylinder 5 as a slidable layer. Thus, the combined cylinder 6 can be produced as a finished plain bearing 9.

At the same time, the metal cylinder 2 is subject to plastic deformation and its profile is corrected so as to conform to the profile of the cavity 11 previously provided with a certain accuracy. Thus, the axis of the metal cylinder 2 together with the resinous cylinder 5 is adjusted in line with an axis of the core pin 7.

In the plain bearing 9 produced in this manner, the metal cylinder 2 exceeds the elastic deformation zone and is subject to plastic deformation. Since its elastic recovery is very slight, the metal cylinder 2 can maintain more or less the profile and dimension at the molding time, the dimensional and profile accuracy of the plain bearing 9 is not affected by the elastic recovery.

Table 1 shows the dimensional and profile accuracy of the plain bearing according to this invention in comparison with that of a conventional resinous plain bearing.

TABLE 1

| | | Comparison in View of Dimensional and Profile Accuracy | | | | |
|---|---|---|---|---|---|---|
| | | | | | | Unit: $\mu$m |
| | | In the outer diameter | | | In the inner diameter | |
| | Outer diametr | Inner diamerer | Cylindricality | Right circularity | Coaxial degree | Cylindricality | Right circularity |
| Plain bearing according to this invention | In $\phi$14 +0~+8 | In $\phi$10 0~−8 | 4 | 4 | 6 | 5 | 4 |
| Conventional resinous plain bearing | In $\phi$12 +0~+40 | In $\phi$10 0~−30 | 25 | 46 | 12 | 15 | 20 |

As shown in Table 1, the right circularity, cylindricality and dimensional accuracy of the plain bearing according to this invention have been improved greatly. More specifically, the error of the outer diameter of the metal cylinder 2 (made of aluminium) prior to the molding treatment was more or less 10 $\mu$m.

However, the error of the metal cylinder 2 according to this invention is within 4 $\mu$m in right circularity, within 8 $\mu$m in outer diameter and within 4 $\mu$m in cylindricality. Because the profile of the metal cylinder 2 can be corrected to conform to that of the cavity 11 of the mold 10 under the high pressure injection molding. By deforming the metal cylinder 2 up to the zone of plastic deformation, the plain bearing of this invention can attain high accuracy.

As shown by arrows of FIG. 9, a slight pressure based on elastic shrinkage of the extended metal cylinder 2 is applied to the resinous cylinder 5, so that such high accuracy of dimension and profile can be obtained.

Further, since the resinous cylinder 5 is integrally associated with the metal cylinder 2 of which linear expansion coefficient is smaller, that of the resinous cylinder 5 is also nearly similar. As a result, the plain bearing 9 according to this example is hardly subject to temperature variation.

Still further, the manufacturing cost of the plain bearing 9 can be reduced considerably. That is, by injecting the fused resins R into the cavity under the high pressure, the resinous cylinder 5 is formed and then integrally associated with the metal cylinder 2 previously inserted into the cavity 11.

IV. A fourth example of this invention will be described.

According to this example, the metal cylinder 2 is manufactured by sintering metallic granules made of aluminium, copper of the like. The manufacturing process in this example is the same as the aforesaid example.

However, the clearance in the metal cylinder insert process should be set to such a degree that the metal cylinder is subject to plastic deformation due to the injection molding pressure of more than 1,000 kg/cm$^2$. It is not always necessary to form the concavo-convex portion 4 on the inner surface of the metal cylinder. The metal cylinder is a sintered body of the metallic granules as well as a porous body. And, the surface of the metal cylinder 2 is provided with a large number of pores. Accordingly, it is possible to make use of those pores as the concavo-convex portion 4, thereby enabling a suitable combination of the metal cylinder 2 with the resinous cylinder 5.

Figure 12:
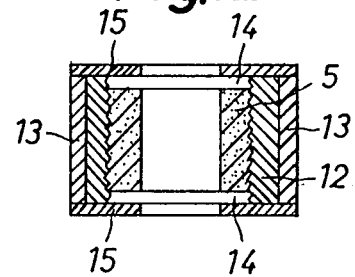

Further, it is optional to impregnate the aforesaid metal cylinder of porous structure with a lubricating oil as will hereinafter be described in the example of FIG. 12.

The function and effect of the plain bearing according to this example are identical with those of the aforementioned examples.

V. A fifth example of this invention will be described with reference to FIGS. 10 to 13.

The metal cylinder of the fourth example which is manufactured by sintering the metallic granules is not so robust in view of strength. The object of the fifth example is to provide a reinforced plain bearing by the following steps.

(1) Step for producing a metal cylinder

A metal cylinder 12 is produced by sintering the metallic granules. In addition, a further metal cylinder 13 for reinforcement is produced in the same manner as the aforesaid metal cylinder 2 has been produced. The metal cylinder 13 for reinforcement is fit on the outer surface of the metal cylinder 12.

(2) Step for inserting the metal cylinder 12 combined with the metal cylinder 13 into the mold cavity As shown in FIG. 10, the metal cylinder 13 for reinforcement is mounted in the cavity 11. The clearance C is set so as to consider the thickness of the metal cylinder 13 and meet the plastic deformation of the metal cylinder 12.

(3) Highly pressurized injection molding step

Since this step is the same as that in the third and fourth examples, its description will be omitted.

Figure 11:
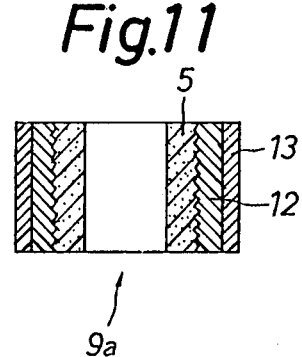

FIG. 11 shows a reinforced plain bearing 9a which has been manufactured by the aforementioned steps. The strength of the plain bearing 9a is reinforced remarkably, so that it can be mounted forcefully in a housing without losing any dimensional deformation.

Further, since the metal cylinder 12 is of a porous structure, it may be impregnated with a lubricating oil. For instance, as shown in FIG. 12, positioned on the resinous cylinder 5 are a pair of oil oozing grooves 14 and mounted on the pair of oil oozing grooves 14 are a pair of seal plates 15. Then, the metal cylinder 12 is impregnated with the lubricating oil.

Figure 13:
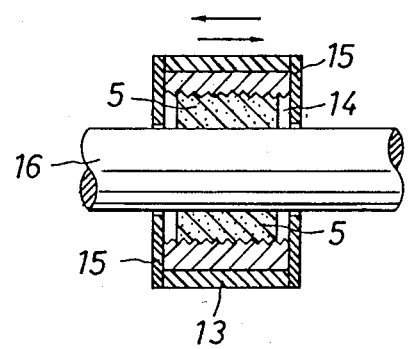

When the plain bearing 9a impregnated with the oil is, as shown in FIG. 13, mounted on a linearly reciprocating shaft 16 for a practical use, the oil is oozed from the pair of grooves 14 and appears between the resinous cylinder 5 and the shaft 16. The friction coefficient of the plain bearing 9a is reduced greatly as shown in FIG. 14 and its abrasion rate is also reduced greatly as shown in FIG. 15.

Figure 14:
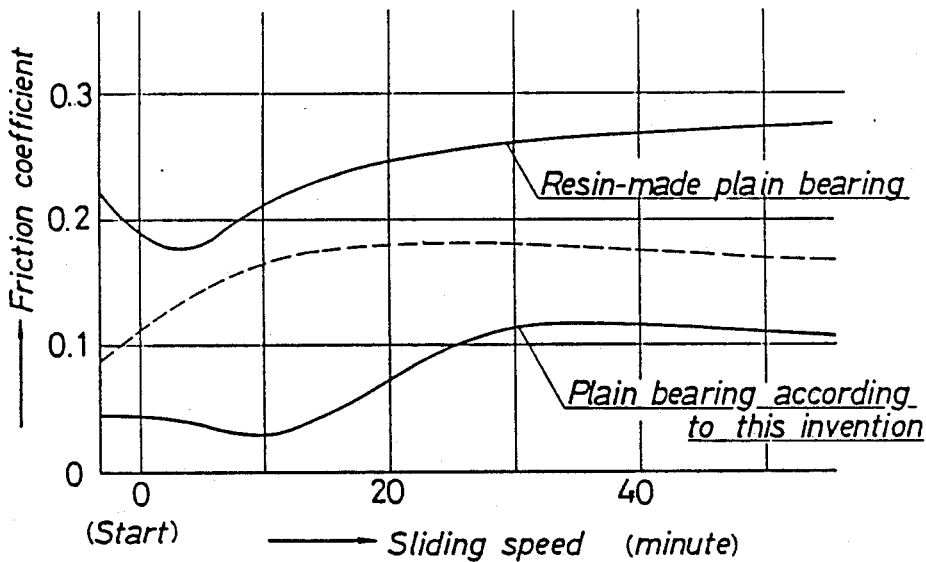
FIG. 14 shows a graph of a friction coefficient of the plain bearing in FIG. 13 in comparison with a resin-made plain bearing.
Figure 15:
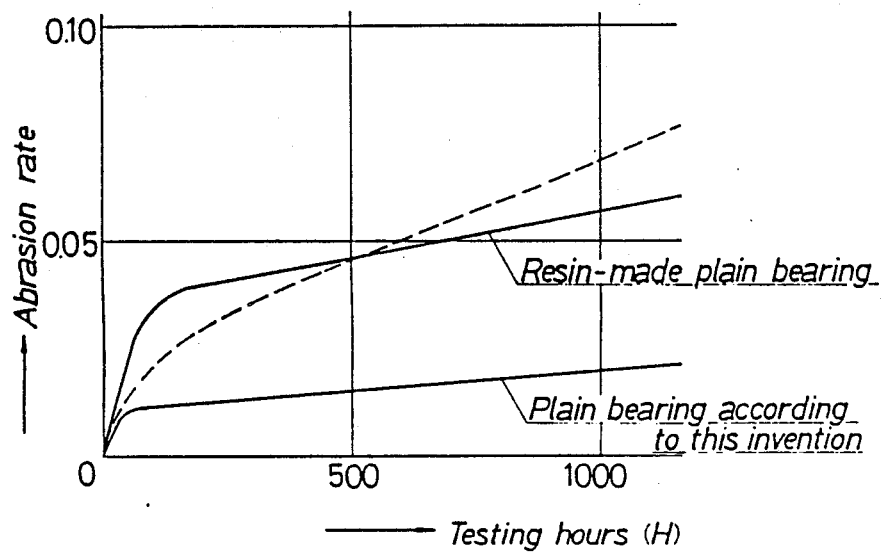
FIG. 15 shows a graph of an abrasion rate of the plain bearing in FIG. 13 in comparison with the resin-made plain bearing.

In FIGS. 14 and 15, the performance of the plain bearing 9a according to this invention is compared with that of a purely resin-made plain bearing made of polyphenylene sulfide. The test in FIG. 14 was carried out at a normal room temperature and the superficial pressure to the plain bearing 9a was 2 kgf/cm$^2$. For reference, the performance of the conventional plain bearing made of ethylene tetrafluoide resin including 20% of glass fiber is shown with a dash line.

The abrasion rate in FIG. 15 was measured by the Suzuki-type Abrasion Test, in which the sliding speed was 9 m per minute, the superficial pressure to the test pieces was 5 kgf/cm$^2$ and the reciprocating shaft was made of stainless steel (SUS 30.4).

Figure 16:
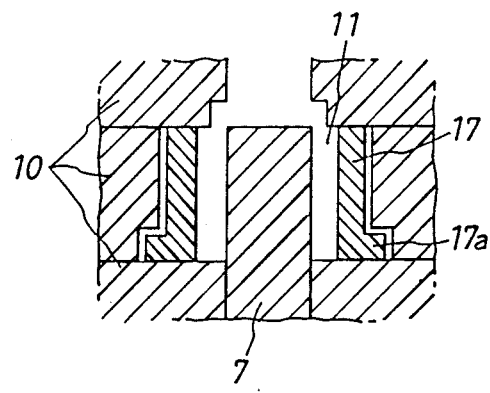
FIGS. 16 and 17 are section views of a process for manufacturing a plain bearing according to a sixth example of this invention.
Figure 17:
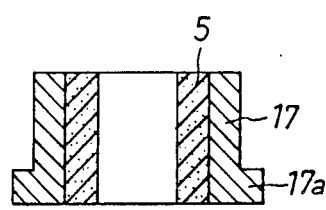

FIGS. 16 and 17 show a sixth example of this invention in which a metal cylinder 17 produced by sintering the metallic granules is provided with a flange 17a. The plain bearing of this example is manufactured in the same manner as the fifth example. FIG. 17 shows a plain bearing having the flange 17a.

Figure 18:
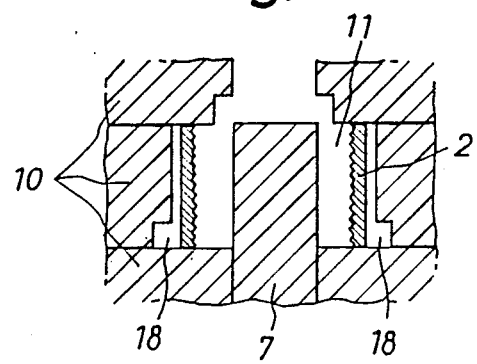
FIGS. 18, 19 and 20 are section views of a process for manufacturing a plain bearing according to a seventh example of this invention.
Figure 19:
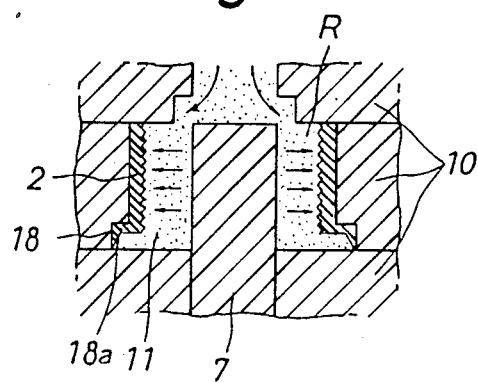
Figure 20:
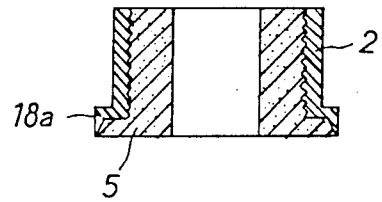

FIGS. 18, 19 and 20 show a seventh example of this invention, in which the plain bearing is also provided with a flange 18a. As shown in FIG. 18, the metal cylinder 2 made of e.g. aluminum is inserted in the cavity 11 having a flange forming portion 18. Subsequently, the fused resins R is injected into the cavity under the high pressure as shown in FIG. 19. Then, the metal cylinder 2 is provided with the flange 18a so as to conform to the profile of the cavity 11. FIG. 20 shows the plain bearing having the flange 18a, which has been manufactured by the aforementioned process.

The aforesaid plain bearings having the flange is provided with the resinous portion having excellent sliding property and show a high resistance to a thrust pressure.

In any of the aforesaid examples the plain bearing is provided with a uniformly smoothened inner surface. Further, by forming a groove for generating dynamic pressure on the sliding portion on the inner surface of the plain bearing, the wearing characteristics may be enhanced further. In the case that such groove is of a spiral form, it is possible to reduce wearing greatly.

The advantages and effects of this invention are as follows.

(1) A bonding strength between the metal cylinder and the resinous cylinder is improved remarkably.

The resinous cylinder is firmly engaged and bitten with the concavo-convex portion of the metal cylinder without using any adhesive and with employing an internal deformation of the metal cylinder. A bonding surface therebetween is completely free from wearing. The durability of the plain bearings of this invention can be extended greatly because of its high wearing characteristics.

(2) The resinous cylinder can be formed as a thin layer.

Since the metal cylinder as an external layer is closely engaged with the metal cylinder as an internal layer, the strength of the plain bearing is maintained, so that the thickness of the resinous cylinder can be thinned. It is possible to set a clearance gap between a shaft and an inner circumference of the plain bearing within 10 $\mu$m. Accordingly, the inner diameter of the plain bearing can be formed with a high dimensional accuracy. The clearance gap is so small that the initial wearing is less and the wearing characteristics is enhanced.

Further, the dimensional deformation due to thermal expansion is so small that the accuracy of the internal diameter of the plain bearing is very stable.

(3) The thickness of the resinous cylinder is thin and the metal cylinder as the external layer is made of aluminium or brass that has a good thermal conductivity. Accordingly, the plain bearing of this invention has a good thermal emission from a sliding portion and the wearing characteristics is improved furthermore.

(4) Since the external member of plain bearing is made of metal, it can be forcefully inserted into a housing without losing any dimensional deformation.

(5) Various conventional plain bearings may be replaced with the plain bearings according to this invention which are applicable for various industrial fields.

What is claimed is:

1. A process for manufacturing a plain bearing, comprising the steps of:
    (a) producing a deformable metallic cylinder having an interior cylindrically-shaped surface;
    (b) forming a concavo-convex portion on said interior cylindrically-shaped surface of said deformable metallic cylinder;
    (c) positioning a resinous cylinder within said deformable metallic surface juxtaposed to said concavo-convex portion formed in said interior cylindrically-shaped surface of said deformable metallic cylinder; and
    (d) inserting a core pin into said resinous cylinder and passing said cylinders through a draw die to deform said deformable metallic cylinder about said resinous cylinder to produce said plain bearing.

2. The process as claimed in claim 1, wherein said deformable metallic cylinder is produced by sintering metallic granules.

3. A process for manufacturing a plain bearing, comprising the steps of:
    (a) producing a deformable metallic cylinder having an interior cylindrically-shaped surface;
    (b) forming a concavo-convex portion on said interior cylindrically-shaped surface of said deformable metallic cylinder;
    (c) inserting said deformable metallic cylinder of step a) into a mold and injecting a fused resin into said mold to form a resinous cylinder about said interior surface of said deformable metallic cylinder; and
    (d) inserting a core pin into said resinous cylinder and passing said cylinders through a draw die to deform said deformable metallic cylinder about said resinous cylinder to produce said plain bearing.

4. The process as claimed in claim 3, wherein said deformable metallic cylinder is produced by sintering metallic granules.

5. A process for manufacturing a plain bearing, comprising the steps of:
    (a) producing a deformable metallic cylinder having an interior cylindrically-shaped surface;

(b) forming a concavo-convex portion on said interior cylindrically-shaped surface of said deformable metallic cylinder;
(c) inserting said deformable metallic cylinder into an injection mold with a clearance between an inner surface of said injection mold and outer surface of said deformable metallic cylinder; and
(d) injecting a fused resin into said injection mold under high pressure against said interior cylindrically-shaped surface of said deformable metallic cylinder to deform said deformable metallic cylinder against said inner surface of said injection mold thereby to bind said concavo-convex portion of said interior cylindrically-shaped surface of said deformable metallic cylinder integrally with resinous portions formed by said fused resin to produce a plain bearing.

6. The process as claimed in claim 5, wherein said deformable metallic cylinder is produced by sintering metallic granules.

7. The process as claimed in claim 5, wherein said clearance is set to plastic deformation of said deformable metallic cylinder at the high pressure injection molding processing of step d).

8. The process as claimed in claim 6, wherein a deformable metallic cylinder is positioned about said sintered deformable metallic cylinder prior to step c).

* * * * *